United States Patent
Berchtold et al.

(10) Patent No.: US 12,547,826 B2
(45) Date of Patent: Feb. 10, 2026

(54) METHOD FOR INTEGRATED GENERATION OF AN AUDIT REPORT

(71) Applicant: audimex ag, Augsburg (DE)

(72) Inventors: Lucas Berchtold, Augsburg (DE); Stefan Berchtold, Augsburg (DE)

(73) Assignee: Aunetic Germany GmbH, Augsburg (DE)

(*) Notice: Subject to any disclaimer, the term of this patent is extended or adjusted under 35 U.S.C. 154(b) by 337 days.

(21) Appl. No.: 17/900,026

(22) Filed: Aug. 31, 2022

(65) Prior Publication Data

US 2023/0035168 A1    Feb. 2, 2023

Related U.S. Application Data

(63) Continuation-in-part of application No. 16/553,493, filed on Aug. 28, 2019, now abandoned.

(51) Int. Cl.
| | |
|---|---|
| *G06F 16/17* | (2019.01) |
| *G06F 16/176* | (2019.01) |
| *G06F 40/106* | (2020.01) |
| *G06F 40/186* | (2020.01) |

(52) U.S. Cl.
CPC ........ *G06F 40/186* (2020.01); *G06F 16/1774* (2019.01); *G06F 40/106* (2020.01)

(58) Field of Classification Search
CPC .................................................. G06F 16/1774
See application file for complete search history.

(56) References Cited

U.S. PATENT DOCUMENTS

| | | | |
|---|---|---|---|
| 8,473,519 B1* | 6/2013 | Siddiqui | H04L 41/0853 707/791 |
| 9,804,768 B1* | 10/2017 | Heilbrunn | G16H 50/20 |
| 10,454,963 B1* | 10/2019 | Smith | G06F 16/2477 |
| 11,533,185 B1* | 12/2022 | Sharma | H04L 9/3263 |
| 2012/0109832 A1* | 5/2012 | Hemenway | G06Q 10/10 705/307 |
| 2017/0053528 A1* | 2/2017 | Van Camp | G08B 29/185 |
| 2018/0165258 A1* | 6/2018 | Scoda | H04L 67/02 |
| 2019/0087386 A1* | 3/2019 | Ono | G06Q 10/06 |
| 2019/0318122 A1* | 10/2019 | Hockey | G06Q 20/3221 |
| 2019/0342304 A1* | 11/2019 | Weintraub | H04L 63/102 |
| 2019/0369575 A1* | 12/2019 | Raina | F24F 11/56 |
| 2020/0134002 A1* | 4/2020 | Tung | H04L 63/20 |
| 2020/0272963 A1* | 8/2020 | Chait | G06Q 10/0635 |

* cited by examiner

*Primary Examiner* — Mohammad S Rostami
(74) *Attorney, Agent, or Firm* — Von Rohrscheidt Patents (57) ABSTRACT

A method for integrated generation of an audit report accessible by plural users that includes the steps of providing a computer connected to a communications network, loading audit software into the computer, providing a display for the computer for viewing by a user, generating an editable audit report from a database, and displaying the editable audit report on the display. The user enters data into the editable audit report which provides a template for entry of the data where the data entered into the editable audit report is stored in the database.

24 Claims, 8 Drawing Sheets

PRIOR ART

METHOD FOR INTEGRATED GENERATION OF AN AUDIT REPORT

FIELD OF THE INVENTION

The invention generally relates to a method for integrated generation of an audit report.

BACKGROUND OF THE INVENTION

Audit reports result from an audit by an internal audit department or other internal and external controlling entities in businesses and organizations. The audit report provides information regarding the audited object, e.g., a legal entity or a business process, describes background and the scope of the audit.

There are several methodologies for generating an audit report with current audit practices. For example, the audit report may be generated in an external document which is separate to the audit documentation. Another example, is the audit report may be generated in an external document which is separate to the audit documentation but an interpreter analyzes the report at the end of report writing and stores contents in the database of the audit software such that existing contents from the audit documentation are overwritten. Yet another example is where the auditor enters all the contents including texts, findings, measures, and any other relevant materials that influence the audit report into an audit software and then generating the audit report using a template. Unfortunately, this methodology results in the audit report being repeatedly generated because the underlying software is being worked on rather than the audit report itself. Yet another example, is where the audit report is initially generated from the audit documentation, then the audit report document is processed further, then portions of the audit report are extracted from the audit report document, and then transposed back into the audit software thereby implementing an update of the audit information.

Prior art methods, such as the above methods, have media interruptions and inconsistencies generated during report writing and generated through redundant data storage, and/or the audit report cannot be worked on in its entirety. Inconsistency of the data is very critical since measures are monitored in a subsequent portion of the audit process to assure measures from the audit report are correctly implemented. When the audit report is inconsistent with the contents of the audit software other measures are monitored that differ from the measures that were specified in the audit report. This requires a substantial manual transposition effort and subsequent checking.

Additionally, current audit support has several problems depending on the variant including:

The report is not visible yet while performing the audit since the report is only generated after the audit.

The report cannot be written cooperatively since only one text document exists and only one person can work on the text document at a time.

Changes performed during "report drafting" and "report reconciliation" must be introduced back into the database manually for documentation purposes (consistency and traceability of the audit results). While some audit systems have the option to automatically read simple text changes from the audit report and to write them back into the database, these audit systems are unable to implement structural and complex changes. For example, changing the weight of a finding can cause the finding to appear in the management summary instead of appearing in the appendix.

Consistency of the audit report and of contents of the database can only be controlled manually with difficulty since the text document has to be compared to contents of the database in many details.

Consistency of the data within the report cannot be assured since word processors allow any type of changes and automatic controls from the software do not work in the word processor (e.g., mandatory fields, business rules, statistical tables, texts which occur repeatedly in the report).

Formatting an audit report is typically performed according to strict rules. When the auditor has a freely editable document available to himself it is very difficult to enforce these rules.

When information like code of a responsible department, an email address or a date value is entered into the report there is a high probability of erroneous entries and thus of an incorrect report.

When actions are taken, a lack of tracking of the measures are tracked by the auditor can create problems because "who", "until when", "what" and other information may not be tracked and/or preserved.

Figure 7:
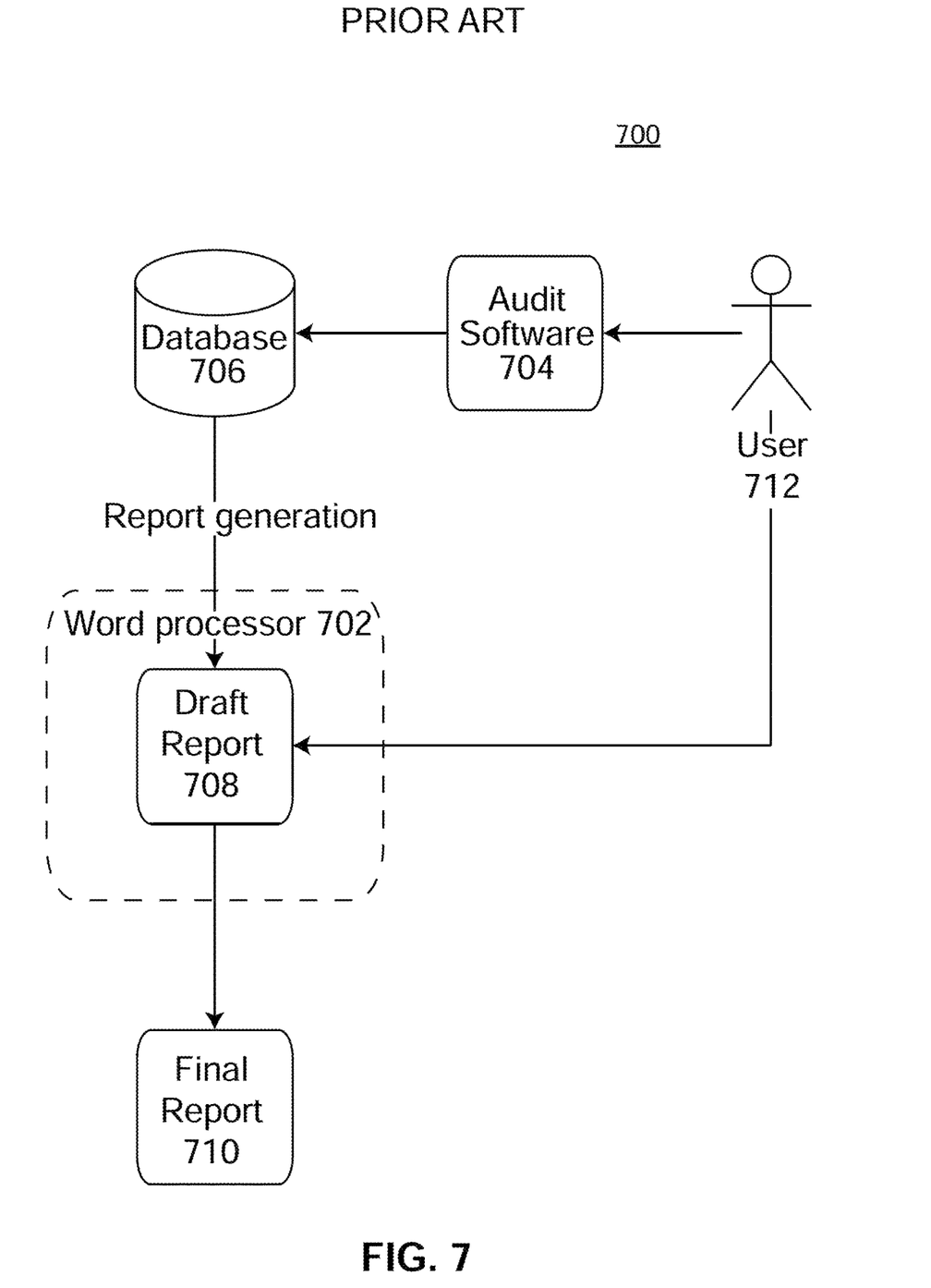
FIG. 7 illustrates a data flow chart for audit reports in accordance with the prior art methods.

FIG. 7 illustrates a data flow chart 700 for audit reports in accordance with the prior art methods above. Users 712 enter data into both, the audit software 704 and the word processor 702. The audit software 704 stores its data in the database 706 whereas the word processor 702 stores its data in the draft report 708. As there are two locations where data is stored, the data can become inconsistent. The users 712 have to fix the inconsistencies manually to produce the final audit report 710.

Accordingly, there is a strong need in for an automated audit report system capable of addressing the foregoing problems.

BRIEF SUMMARY OF THE INVENTION

An exemplary method for integrated generation of an audit report accessible by plural users according to the invention includes the steps of providing a computer connected to a communications network, loading audit software into the computer, providing a display for the computer for viewing by a user, generating an editable audit report from a database, and displaying the editable audit report on the display. The user enters data into the editable audit report where the editable audit report provides a template for entry of the data such that the data entered into the editable audit report is stored in the database.

The audit report may be continuously visible during a processing of the audit report.

Objects may be integrated into an external word processing system or in that the audit software includes an integrated word processing system which can also tie in objects. The objects may include findings or measures.

The storing the data in the database may occur immediately.

The method may further include generating a list of objects which are loaded to generate the editable audit report.

The editable audit report may be generated from a current content of the database when the audit software is started. The editable audit report may include editable and non-editable portions, which of the portions are editable and which of the portions are non-editable is determined from a fragment list compiled after the editable audit report is generated from the current content of the database. When a fragment in the fragment list is changed, all objects in the object list that are affected by the change may be changed in the database. For each user of the audit software, the audit software may monitor for when the object in the object list is changed and changes the editable audit report to reflect the changes in the object list. The audit software for each user may have a time stamp of when each object in the object list was last updated, and each object in the object list in the database may include a time stamp indicating when it was last changed.

Plural users may work on the editable audit report simultaneously. The editable audit report may include editable and non-editable portions, and each of the editable portions may be editable by only one the plural users at a time. When a user of the plural uses moves a cursor into an editable portion of the editable portions, a check may be made by the audit software whether another user of the plural users is currently editing that editable portion of the editable portions. When an editable portion of the editable portions is being edited by one of the plural users, this editable portion of the editable portions may become blocked from editing until at least one of the following occurs: the one of the plural users exits the editable portion of the editable portions that was blocked from editing, or the one of the plural users exits the audit software, or the one of the plural users is inactive for a predetermined period of time, or the one of the plural users actively overrides the blocking. When an editable object of the editable portions is being edited by one of the plural users, this editable object of the editable portions may become blocked from editing by being listed as the current user until the one of the plural users is deleted for the current user for the editable object of the editable portions.

A method for integrated generation of an audit report accessible by plural users, the method including the steps of providing a computer connected to a communication network, loading audit software into the computer, providing a display for the computer for viewing by a user, generating an editable audit report from a report template and a database including objects and properties, generating an editable draft audit report from the report template and the database including objects and properties, displaying the editable audit report on the display, displaying the editable draft audit report on the display, and the user entering data into the editable audit report and/or the editable draft audit report. The editable audit report provides a data entry template for entry of the data. The data entered into the editable audit report is entered into editable fragments. The data entered into the editable draft audit report is entered into editable fragments. When a particular user begins editing one of the editable fragments of the editable audit report or the editable draft audit report, only the particular user can edit the one of the editable fragments of the editable audit report or the editable draft audit report until the particular user finishes editing the one of the editable fragments of the editable audit report or the editable draft audit report and any changes made to the one of the editable fragments of the editable audit report or the editable draft audit report by the particular user are processed and stored in the database. The objects and properties of the database are processed by the computer and then the data is transformed by the computer into text in the editable audit report and/or the editable draft report based on a logic of the report template during the generating the editable audit report or the editable draft audit report from the database and the report template.

The audit report may be continuously visible during a complication of the audit report. The audit software may be integrated directly into a word processor program that stores the editable audit report in modifiable components. The data objects may be integrated into an external word processing system or the audit software may include an integrated word processing system which can also tie in data objects. The data objects may include findings or measures. The audit software may include an integrated word processing system able to tie in data objects. The storing the data in the database may occur immediately. The method may further include generating and maintaining a list of data fields which are currently edited by users including a time of last reading. The editable audit report may be generated from a current content of the database when an audit report console of the audit software is started. The editable audit report may include editable and non-editable portions, which of the portions are editable and which of the portions are non-editable is determined from a fragment list compiled after the editable audit report is generated from the current content of the database. When a data field in the fragment list is changed, all data fields in the fragment list that are affected by the change may be changed in the database. For each user of the audit software, the audit software may monitor for when a data field in a data field list is changed and changes the editable audit report to reflect the changes in the data field list. The audit software for each user may have a time stamp of when each data field in the data field list was last updated, and each data field in the data field list in the database may include a time stamp indicating when it was last changed. Plural users may work on the editable audit report simultaneously. The editable audit report may include editable and non-editable portions, and each of the editable portions is editable by only one of the plural users at a time. When a user of the plural uses moves a cursor into an editable portion of the editable portions, a check may be made by the audit software whether another user of the plural users is currently editing that editable portion of the editable portions. When an editable portion of the editable portions is being edited by one of the plural users, this editable portion of the editable portions may become blocked from editing until at least one of the following occurs: the one of the plural users exits the editable portion of the editable portions that was blocked from editing, or the one of the plural users exits the audit software, or the one of the plural users is inactive for a predetermined period of time, or the one of the plural users actively overrides the blocking. When an editable data field of the editable portions is being edited by one of the plural users, this editable data field of the editable portions may become blocked from editing by being listed as the current user until the one of the plural users is deleted for the current user for the editable data field of the editable portions. When the editable audit report is generated, the editable audit report may be given a globally unique identifier, and the following information is generated: the report template used to create the editable audit report, an identification of an audit for which the editable audit report is generated, a user who created the editable audit report, a time of generation of the editable audit report, a fragment list of each editable fragment used in the editable audit report, and a data field access history of the editable audit report. Data may be loaded from the database and inserted into the editable audit report as fragments when generating the editable audit report. The editable fragments may include a first class of fragments, a second class of fragments, and a third class of fragments. The first class of fragments has multiple data fields that are directly editable but does not include a mask reference, the second class of fragments has only one data field that is not directly editable and includes a mask reference, and the third class of fragments has multiple data fields that are not directly editable and includes a mask reference. Each editable fragment may determine its associated report global unique identifier, fragment global unique identifier, and class during editable audit report generation. For each data field that is part of the first class of fragments or the second class of fragments, a data field access history may be recorded when each data field was read and written. Each editable fragment may only be edited by one user at a time. Each editable fragment of the first class of fragments may have an associated marker having a global unique identifier where the associated marker has a starting portion at the beginning of each editable fragment of the first class of fragments and an ending portion at the end of each editable fragment of the first class of fragments.

BRIEF DESCRIPTION OF THE DRAWINGS

The invention will be described in detail with reference to the following drawings in which like reference numerals refer to like elements wherein.

DETAILED DESCRIPTION

A typical audit is performed as follows:

Audit preparation: it is being determined what is being audited, where the audit is performed, the audit assignment, and the methodology of the audit, which topics are being audited and which audit steps are to be performed, and the like.

Audit execution: the actual audit steps are performed and documented. Furthermore, findings are issued as an essential result of the audit that specify identified problems and risks and associated measures, by which actions that solve the problems or mitigate the identified risks.

Report writing: a first draft is generated from the results of the audit and from the master data. The first draft is then manually refined by the audit team into a "draft audit report." Findings and measures are consolidated and amended again in the draft audit.

Audit report reconciliation: the draft audit report is reconciled within the audit team, with management of the audited entity and with the manager of an internal audit department or the company unit in charge.

Final report: the final report document is generated and then officially distributed to audited parties and other parties.

Measure implementation monitoring: implementation of measures is monitored by the auditor. Here is it monitored whether the audited parties comply with "who," "up to when" and "what."

The audit report is typically generated in a word processing format (.docx, .rtf and the like). There are four typical methods for generating an audit report used by internal and external audit departments:

a) External report writing: using this method the auditor operates in two worlds. On the one hand side the auditor generates audit documentation with or without software support. Independently therefrom the auditor generates an audit report in a word processing system. The audit report is then reconciled, signed off and distributed. Eventually the final findings and measures from the audit report are manually transposed or reconciled in the audit software and thus in the measure monitoring.

b) External report writing with interpreter: this method is similar to external report writing but after generating the final text report an additional step is performed where the audit report is interpreted by syntax rules and analyzed. Thus, important data like findings, audit actions, measures and other properties can be substantially subtracted form the report. These data are then stored in the database of the audit software. Audit documentation, in particular findings and measures, already stored in the audit software is either overwritten or duplicated according to this method.

c) Repeated report generation: in this method, the audit software generates the audit report from data in the database of the audit software (texts, findings, measures, audit actions, master data of the audit, etc.) after completion of the audit. The auditor always works only in the audit software and changes texts and other data in the audit software. Thereafter the auditor generates the audit report periodically in order to be able and check the audit report in one piece. However, the auditor never sees the audit report while entering data but only thereafter. Thus, normal writing in one piece is not possible.

d) Generating the audit report with back writing: according to this method an audit report is generated from data in the database of the audit software (texts, findings, measures, audit actions, master data of the audit, and the like) together with an audit template after completing the audit. The audit report is then worked on and reconciled as described in the external report writing. Conventional audit software is furthermore capable to integrate individual texts that were changed in the report back into the database of the software. This is achieved by write protecting the document in sections that are not to be modified. The modifiable locations are marked and can be transposed backward from the audit report into the audit software. Typically, only text is supported but not fields like select lists, date fields, and the like.

However, unlike the prior art methods above, the method according to the invention integrates the audit software directly into a word processing system and stores the audit report during report writing not as a document as is done in the prior art but in modifiable components. This has the advantages of avoiding redundant data storage and avoiding the problems recited supra.

The integration is performed in that objects like findings or measures are integrated into an external word processing system (e.g., Microsoft Word) or, in that the audit software includes an integrated word processing system which can also tie in objects. It is advantageous in this context that the auditor always feels like he is working on a document that is as close to the final report as possible. This is achieved in that the auditor works on a perceived document in the word processing system. Storing the individual components of the report is done in the background and thus in a manner that is not noticed by the user.

Figure 8:
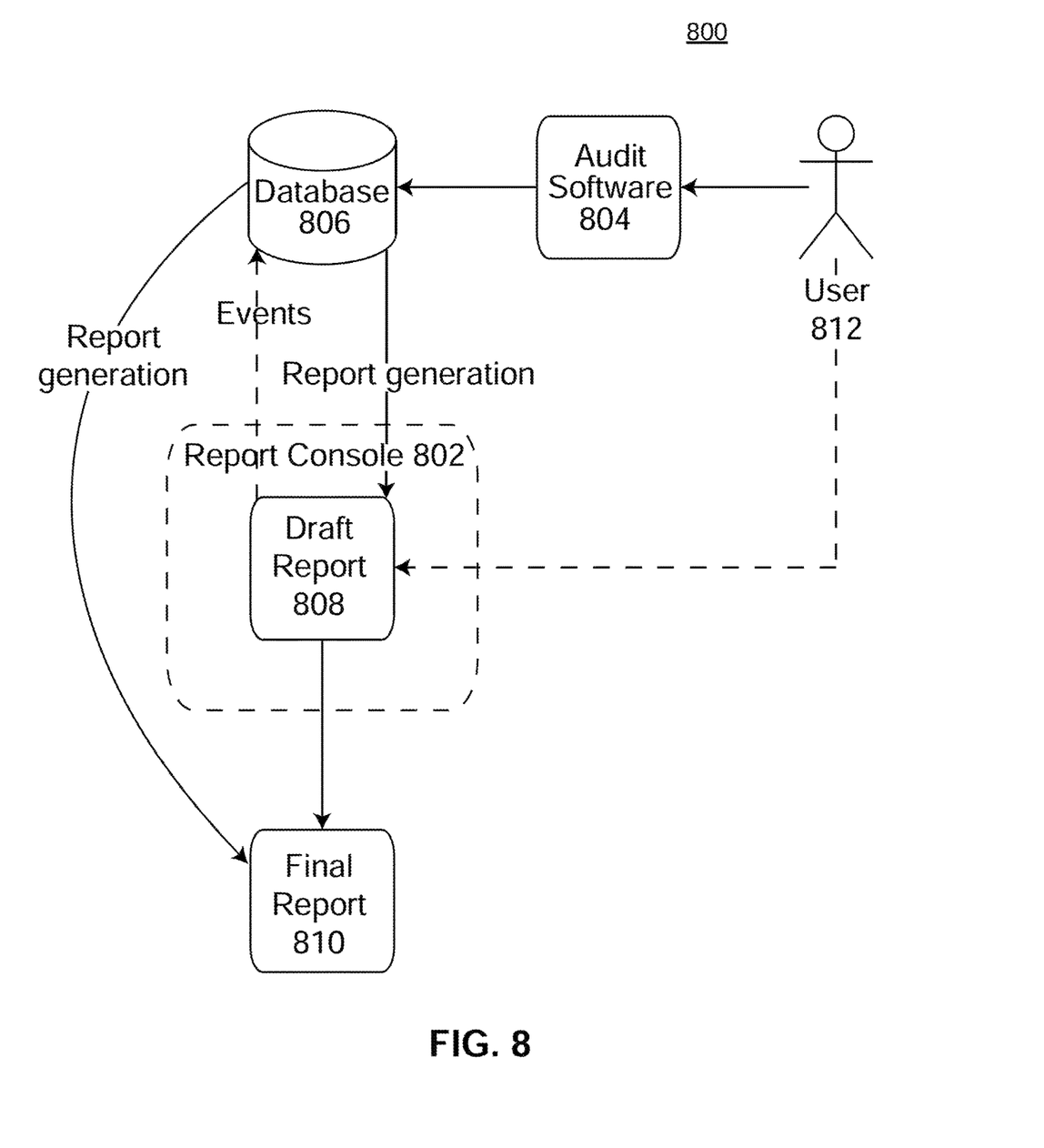
FIG. 8 illustrates a data flow chart for audit reports in accordance with the present invention.

FIG. 8 illustrates a data flow chart 800 for audit reports in accordance with the invention. The key points for data flow are into the report console 802 and into the audit software 804. Users 812 enter data into both, the audit software 804 and the report console 802. Data input made in the report console through the draft report 808 is stored in the database 806. However, unlike the flow chart 700 of the prior art, when a user 812 of the invention directly enters data into the draft audit report 808 and event is triggered that causes the directly entered data to be stored in the database 806. This does not occur in the prior art. Thus, in the invention, all entered data is stored in a single place, the database 806, irrespective of whether the data was entered through the audit software 804 or was directly entered into the draft audit report 808. Therefore, no inconsistencies can occur because everything is stored in the database 806.

Audit Report

The audit report is the result of the described process and summarizes the key results of the audit. It is generated by the generator based on the template and the database contents and then further edited by the auditor in the report console.

Fragment

A fragment of a report is created in the report generation process by evaluating the control structures of the template. A fragment is an area in the audit report where editing of data is permitted (directly and/or indirectly). The template explicitly defines which area in the audit report is a fragment. This definition also uniquely determines the fragment class.

Fragment Class

The fragment class typifies fragments. It expresses whether the content is directly editable and whether the content can be edited inline as text.

Determination of the Fragment Class

Fragments fall into one of the following fragment classes discussed below. The classification is based on the following properties:

Mask reference: Does the fragment have to be edited on a separate mask?

Multiple data fields: Does the fragment represent exactly one uniquely identifiable data field?

Direct editability: Can the fragment be directly modified textually in the report console?

| Class | Mask Reference | Multiple Data Fields | Direct Editability |
| --- | --- | --- | --- |
| 1. Direct Field Editing | No | Yes | Yes |
| 2. Indirect Field Editing | Yes | Yes | No |
| 3. Visualization | Yes | No | No |

Class 1 fragment (Direct Field Editing): Class 1 fragments are edited as text in the text editor of the report console, and they represent exactly one data field that has not been transformed in the template. This allows direct editing in the text. Changed contents are stored directly in the database without (reverse) transformation. For example, the audit scope, name of the audit, title of an audit finding, and text of an audit finding are class 1 fragments.

Class 2 fragment (Indirect Field Processing): Class 2 fragments are generated by the generator as contiguous text, and they represent exactly one data field that was transformed in the template. This means that direct editing in the text is not possible, and editing must take place on a mask in the software. For example, the start date of the audit, due date of a task, severity of a finding, responsible body of a task, and status of a task are class 2 fragments.

Class 3 fragment (Visualization): These fragments are generated by the generator in an arbitrary way. In contrast to class 1 fragments and class 2 fragments, class 3 fragments represent several data fields and their data relationships. As a result, direct editing in the text of class 3 fragments is not possible, and editing must take place on a screen in the software. For example, the audit objects of the audit, list of auditors, and statistics findings by severity are class 3 fragments.

Figure 4:
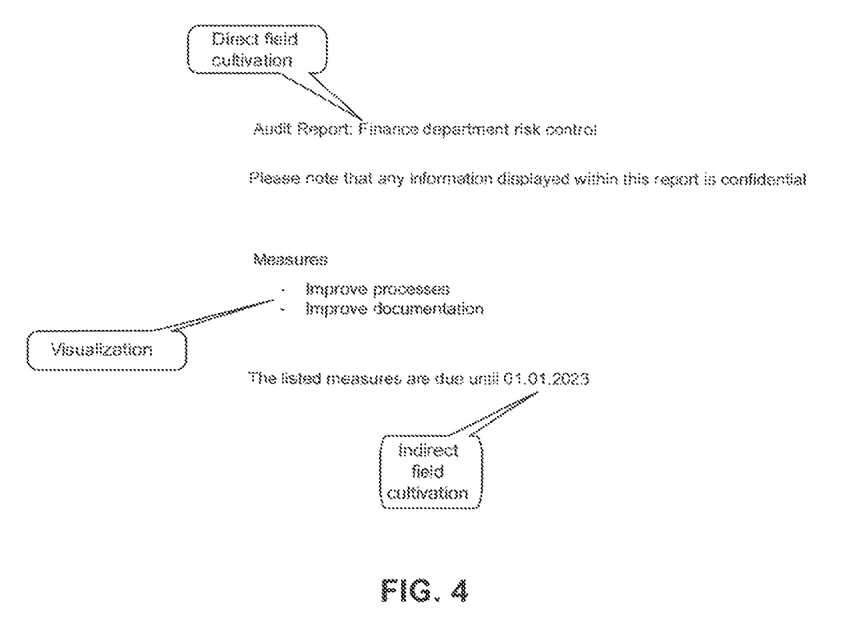
FIG. 4 is an example of fragment classes.

FIG. 4 is an example of fragment classes.

Fragment List

A fragment list is a list of all fragments within an audit report.

Determination of the Fragment List

The following properties are determined for each fragment (i.e., class 1 fragments, class 2 fragments, and class 3 fragments) during report generation:

Report GUID

Fragment GUID (unique in the document)

Fragment class

In addition, the following properties are determined for class 1 fragments and class 2 fragments but not for class 3 fragments:

Data field

Table/class of the referenced data object

Column/property of the referenced data object

ID of the referenced data object

In addition, the following property is determined for class 2 fragments and class 3 fragments but not for class 1 fragments:

Reference to edit mask

Generation and Updating of the Data Field Access History

Furthermore, for each data field that is part of a class 1 fragment or class 2 fragment, the data field access history records when the data field was read and written. The list contains entries of the type:

Table/class of the referenced data object

Column/property of the referenced data object

ID of the referenced data object

Time of the last read access (initial generation or update)

This list is used to detect conflicts and automatically update class 1 fragments in the reporting console.

Write Protection and Marking of Objects

The report generator generates a read-only document. However, report generator allows exceptions such as explicitly marked areas in which editing is possible. (For example, "The listed measure is due until 1.1.23." where "The listed measure is due until" is read-only while the date of "1.1.23" is editable.) This only applies to class 1 fragments.

When a fragment is generated, it is marked in the text as follows

Start marker: Just before the fragment (for class 1 fragments: in read-only area)

End marker: Just after the fragment (for class 1 fragments: in read-only area)

Each marker stores information about the fragment, in particular the fragment GUID. This makes it possible for the later methods within the text editor to recognize from which fragments the respective parts of the document have been created.

Integrated Audit Console

The method according to the invention that uses integrated report writing solves all problems recited supra.

The basis of the report console is a word processor. The word processor can be integrated into the software, or the method can be integrated into an existing word processor like Microsoft Word or any other word processor that fulfils the necessary technical requirements allowing implementation of the method according to the invention. From a user point of view the method according to the invention runs within the word processor.

In essence, the invention according to the invention is the word processor is not used to generate a document like in the prior art but as a form. Thus, the word processor provides a framework into which the user enters the data that is relevant for the report. All changes to text or other objects are immediately stored in the database. This has the advantage of it avoids media interruption.

Report Generation

In a first step of the method, the audit report is generated from contents of the database and a report template. The result of this generation process is displayed in the word processor and is editable in the word processor. The format of the document in the word processor is irrelevant for the method according to the invention and up to this first step the method corresponds to the conventional method.

A template is used for the generation of reports which is a formatted text (e.g., a DOCX document) and may contain information about:
- Static texts (such as headlines, disclaimers, company information)
    - Structural text information (such as tables, paragraphs, page information, headers, and footers, etc.)
    - Formatting (such as fonts, bold, font size, etc.)
    - Control structures for dynamic content
        - Conditions (IF statements, such as conditional formatting of content depending on data)
        - Loops (FOR statements, such as enumerations of data records)
        - Variables
            - Simple output of one or more variables
            - Complex transformations of data/objects from the database (e.g. graphical representations of data)

In the case of DOCX documents, the control structures are stored in so-called "fields". Any other meta structure in the document can also be used, e.g., bookmarks.

Figure 3:
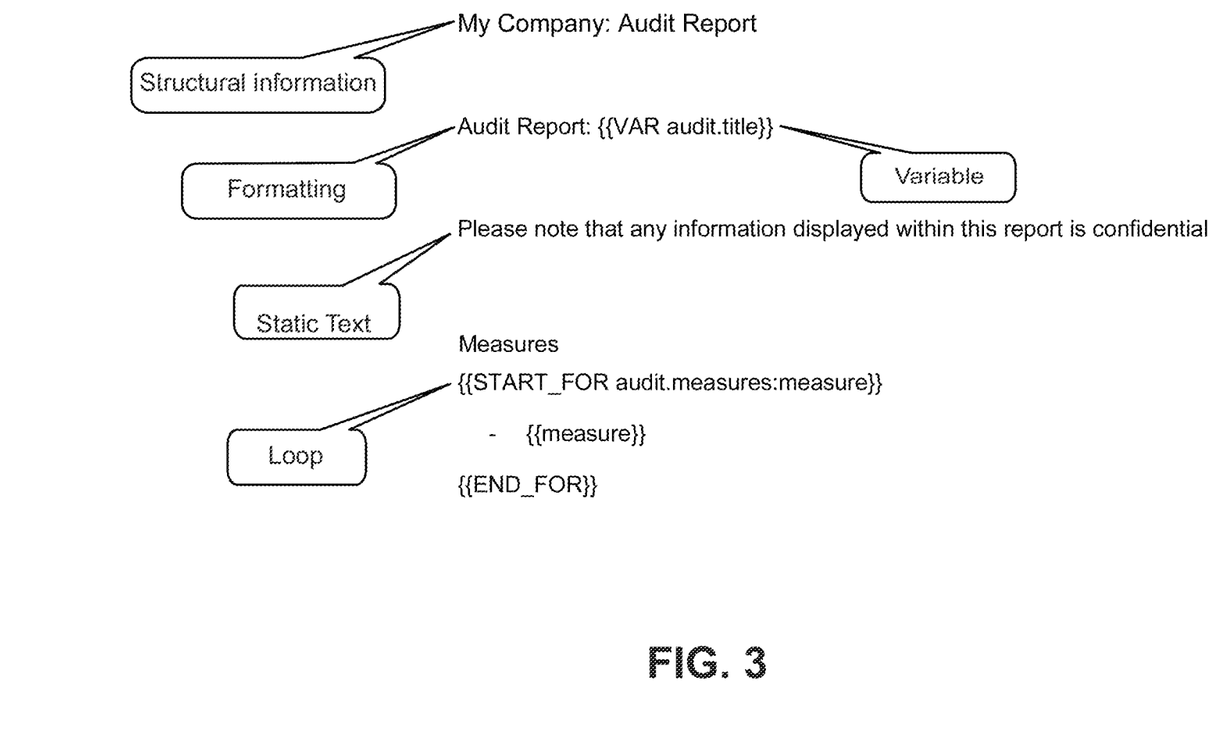
FIG. 3 is an example of meta structures in a report template.

FIG. 3 is an example of meta structures in a report template. When generating the report, the template is seen as a piece of software that is interpreted by the report generator. The control structures correspond to commands of a program that are executed. Data is loaded from the database, variables are replaced by the corresponding texts, control structures such as "IF" and "For" are evaluated according to the parameters.

Figure 1:
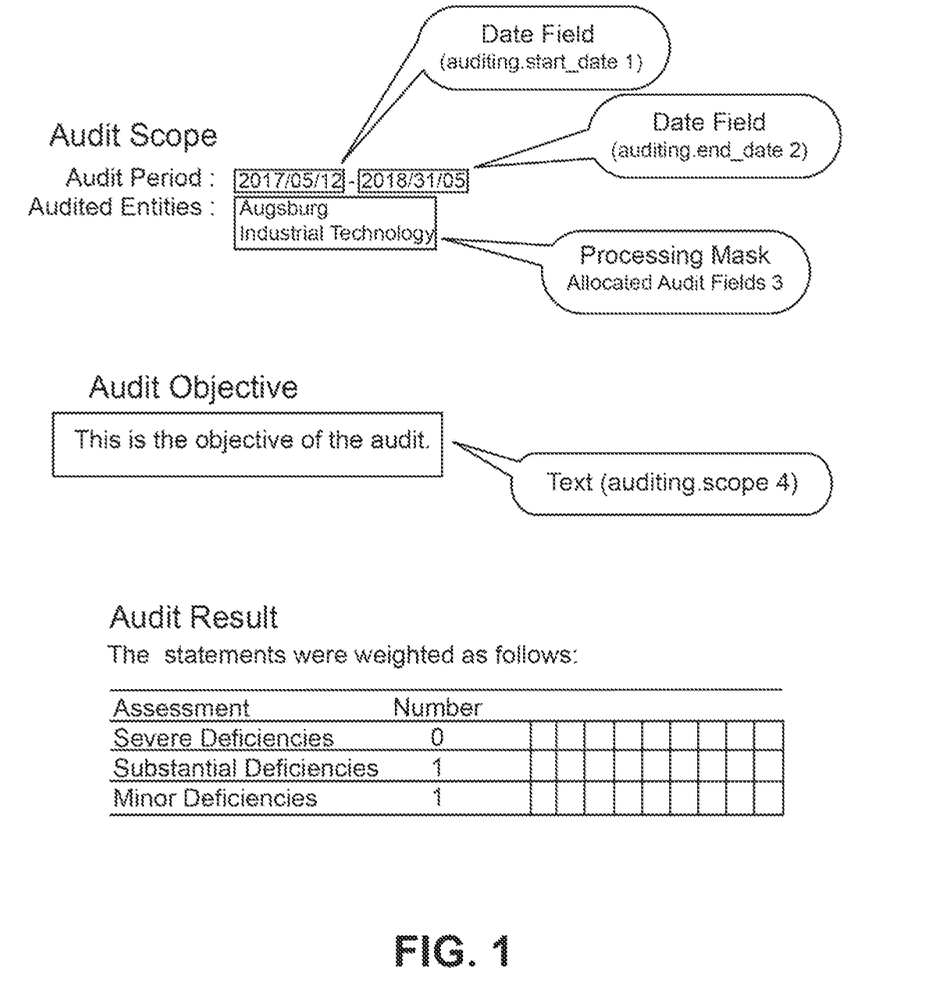
FIG. 1 illustrates an exemplary embodiment of a portion of an audit report.

When the report is generated, it is given a unique identifier. The following information is created when the report is generated:
- Report GUID
- The generated document
- Template used
- ID of the audit for which the report is generated
- User who created this document
- Time of generation
- Fragment list
- Data field access history A data field access history is a list of all relevant data fields with meta properties. This is generated during generation and then subsequently updated. The data field access history manages when a data field was last read. When generating the audit report, data is loaded from the database and inserted into the audit report as fragments. These fragments represent data fields. In the further course of the method, it must be possible to identify which fragment arose from which data field. For example, see FIG. 1 which is discussed below.

Report Console

A report console is a mask in the audit software (or extension of an existing word processor) in which the user creates the audit report. The main component of the mask is a word processor for formatted texts. In addition, the mask contains at least the actuators for "Regenerate Report Completely" and to "Save" a newer version of the report. The format of the document and the way in which it was written are irrelevant to the method.

Report Processing

When the mask in the audit software is entered by the user, the following process takes place:
- The mask is built up on the screen.
- The report is generated.
- The generated report is displayed in the embedded word processor.
- Write protection is applied according to each affected fragment according to its respective class.
- Write protection due to conflicts is applied (see Display of blocked areas section).
- For class 2 fragments and class 3 fragments:
    - Icons are displayed at the edge of the document, indicating that the fragment can be (indirectly) edited here.
    - Event-based handlers are instantiated, which ensure that the corresponding mask is opened when the area or the according icon is double-clicked.
- The cursor is placed at the top of the document.
- Then the user can move around within the integrated word processor and make changes.

The method distinguishes the following four events:
- Event 1: The cursor is moved to a directly editable area (class 1 fragment).
- Event 2: The cursor is moved out of a directly editable area (class 1 fragment).
- Event 3: The user double-clicks in a class 2 fragment or class 3 fragment which opens the corresponding editing screen.
- Event 4: time-driven trigger.

Event 1: Entering an Editable Area

When the cursor is placed in an editable area, the following steps occur:
- Determination of the associated start marker (text marker that marks the beginning of the fragment).
- Determination of the corresponding end marker (text marker that marks the end of the fragment).
- Check whether the two markers refer to the same report fragment (comparison of fragment GUIDs).
- Error output and re-generation of the report if either the text marks could not be determined, or they are not consistent.
- Determining the GUID of the fragment from the bookmark.
- Determining the data field using the fragment list.
- It is checked via the data field edit list (conflict check) whether another user is currently editing this data object. This is done with the following procedure:
    - Determination of the property "currently edited by" via the data field editing list.

Figure 5:
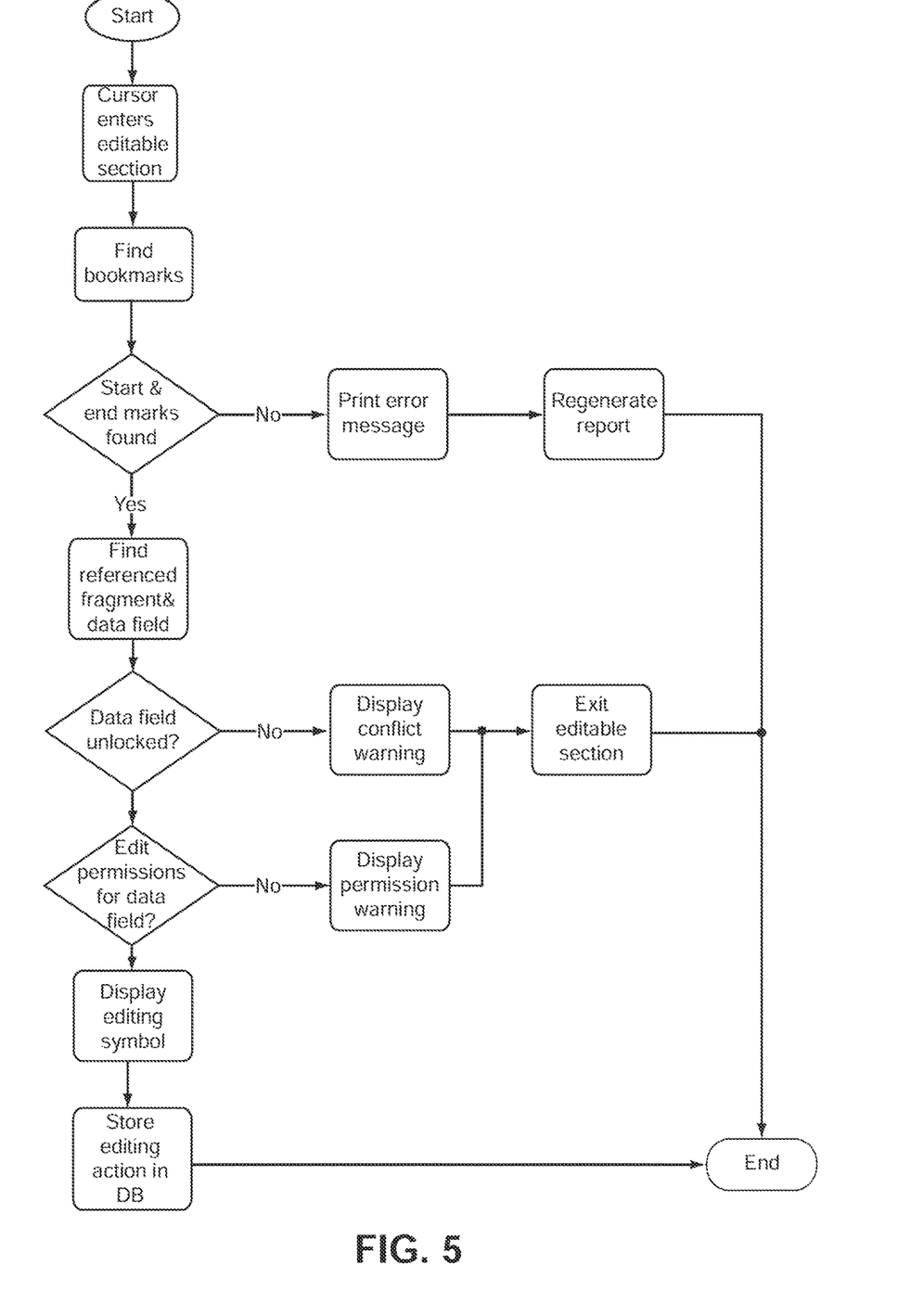
FIG. 5 is a flowchart for Entering an Editable Area.
Figure 6:
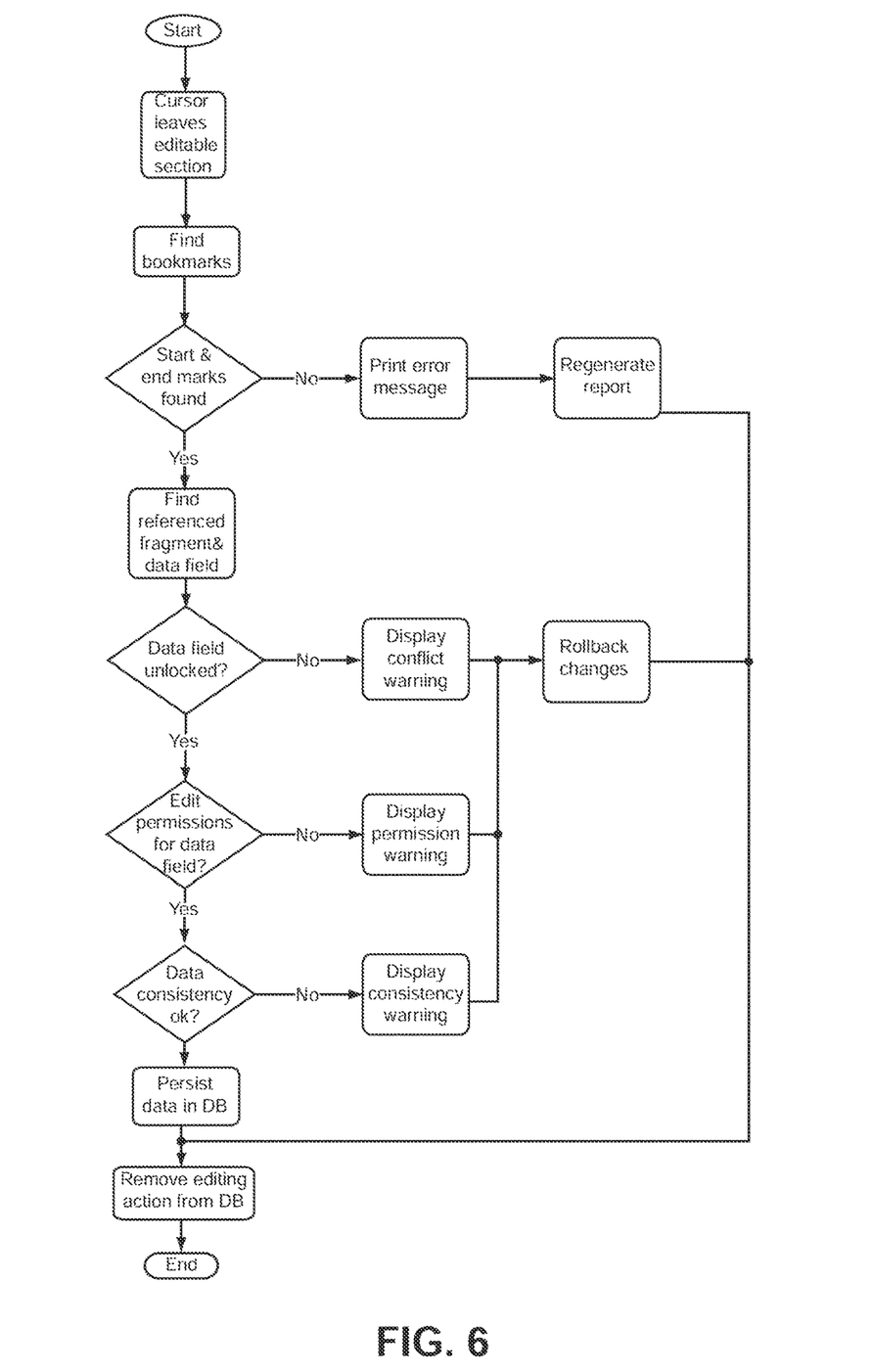
FIG. 6 is a flowchart for Leaving an Editable Area.

If a conflict occurs ("currently being processed by" field is set):
    If this is signaled to the user by a message ("User X has been editing this data field since . . . ").
    The cursor is moved in front of the edited area.
A request is sent to the audit software asking whether the current user is allowed to edit this data object (authorization check).
    If editing is not allowed:
        The user receives a corresponding message on the screen.
        The cursor is moved out of the editable area.
    If no conflict occurs and editing is allowed:
        Is the user visually signaled that he has now entered an editable area (high lighting or icon on the edge of the document).
        An entry is stored in the data field editing list with the information:
        Data field.
        Editing user.
        Start date of processing.
The user records his changes to this fragment.
FIG. 5 is a flowchart for Entering an Editable Area.
Event 2: Leaving an Editable Area
If an editable area is left (class 1 fragment only), the following steps occur:
    Determination of the associated text marker that precedes the text.
    Determination of the associated text mark that is behind the text.
    Check whether the two markers refer to the same fragment (comparison of fragment GUIDs).
    Error output and re-generation of the report if either the text marks could not be determined, or they are not consistent.
    Determining the GUID of the fragment from the bookmark.
    Conflict check (see Event 1).
    Authorization check (see Event 1).
    The text of the fragment is extracted and stored in the database. When saving, the system checks whether the change is valid (for example: mandatory fields, or business rules). The user can therefore only save consistent, correct data. This means that the data in the audit report is always correct in the sense of these rules. If a value is not correct, an error is signaled to the user and the old value in the text is restored.
    The entry in the data field edit list is deleted. This is done with the following method:
        Determination of the data field via the fragment list.
        The entry in the data field edit list is deleted.
FIG. 6 is a flowchart for Leaving an Editable Area.
Event 3: Opening an Edit Mask
Class 2 fragments and class 3 fragments cannot be edited directly in the text. Therefore, the underlying data is maintained via a mask in the audit software. These steps, for example, may include:
    Changing the logical order of texts or statements.
    Unification of two findings.
    Deleting a finding or other data object that affects the report.
    Maintenance of the auditor list.
    Changes to master data.
From the user's point of view, the following method takes place:
    For class 2 fragments and class 3 fragments an icon appears in the margin of the document.
    If the user clicks on this icon, the maintenance mask stored for the fragment opens.
    The user edits the data in the mask and saves.
    The audit software stores the data in the database.
    The user closes the mask.
    The report console changes the icon at the edge of the screen to indicate that a change has been made where the data was changed.
    The button for re-generating the audit report in the report console is high-lighted.
Event 4: Timed Trigger
Using an embedded clock or other mechanisms, a timed trigger is fired at a regular (configurable) time interval. The timed trigger has two tasks:
    Updating information that has been changed by other users.
    Avoidance of editing conflicts by displaying avatars and blocking areas.
When the timed trigger is activated, the whole text is sequentially processed in the word processor. If a class 1 fragment or class 2 fragment is found, the following steps are performed:
    Updating changed contents.
    Display of locked areas.
Updating of Changed Contents
    For the fragment in question, the system determines whether a change has been made to the underlying data field by other users. The following method is used for this purpose:
    Determination of the data field via the fragment list.
    Determination of the corresponding entry in the data field access history for this data field.
    Determining the time of the last change. Preferably, but optionally, the auditing software provides a technical mechanism that logs when and by whom a change is made for each change.
    If the "time of last read access" of the data field is before the "time of last change" of the data field, this means that the data field has changed in the meantime.
    If the fragment is a class 1 fragment, the fragment can be updated directly. The following method is utilized:
        Loading the text from the database.
        Replace the fragment with the text.
        The "Time of last read access" field of the "data field access history" for this data field is updated.
    If the fragment is a class 2 fragment, the following method is utilized:
        An icon in the margin of the document indicates that the content is no longer up to date.
        The button for updating the audit report is high-lighted.
Display of Blocked Areas
    To allow the user to recognize early on that an area in the text is currently being edited by another user, the report console locks these areas for editing. In principle, they remain writable areas, but editing them currently makes no sense since they are currently being edited by another user. Accordingly, the following method is utilized:
    Determination of the data field via the fragment list.
    Determination of the corresponding entry in the data field editing list for this data field.
    If the field "currently edited by" of the data field is occupied by another user, this means that another user is currently editing the data field.
    The data field is in process:
        Set a write protection for this fragment.
        Display of an avatar at the edge of the document (small portrait picture or similar) of the respective user at the edge of the document. When clicking on the avatar, the user receives the following information:
Modifying the user.
Date of last change.
The data field is not in process:
Unlocking the write protection.
Removing the avatar.

Template

A template serves as a template document for generating an audit report. The template is available as a formatted document (e.g., docx). During report generation, an audit report is generated by filling the dynamic contents (control structures) of the template.

Control Structure

A control structure is a program statement in the template that is used to control the generation process (e.g., conditions, loops, or references to content from a database).

Data Object

A data object is a complex object consisting of several data fields. The data object contains information for report generation that is stored in the database (for example, an audit with the title "Audit A" and the planning date 01.01.2023).

Data Field

A data field is a concrete property of the data object (e.g., the audit title "Audit A").

Data Field Edit List

A data field edit list is a list of all relevant data fields with meta properties. This data field edit list is generated during generation and then updated in the further process. The data field edit list manages which user is currently editing a particular data field.

Generation and Updating of the Data Field Edit List

The data field edit list is used to manage which user is currently editing which data field. This only concerns class 1 fragments.

The data field edit list contains entries of the type:
Table/class of the referenced data object.
Column/property of the referenced data object.
ID of the referenced data object.
Currently edited by user (this entry is used in the further procedure to indicate that another user is currently editing the data field).

The data field edit list is stored in a central data storage and is available to all report consoles. The filling of the data field edit list takes place within the handling of events 1, 2, and 4.

Data Field Access History

A data field access history is a list of all relevant data fields with meta properties. This data field access history is generated during generation and then updated in the further process. The data field access history manages when a data field was last read.

Additional Structural Processing

During normal processing of the audit report, a situation can present itself where the audit report is generally restructured. This can be caused by several situations such as:
change of logical sequence of text or statement,
combination of two findings,
deletion of one statement or of another object that influences the report,
change of master data, and/or
changes which influence the type of template (For example, changes of the type of audit).

This type of processing can be performed either in the audit software or in the edit mask of class 3 fragments. This type of processing eventually changes the data on which the audit report is based for data that influences the audit report. Therefore, in general a new generation of the audit report is necessary. Details are described in section "Event 3: Opening an edit mask"

Cooperative Report Editing

In order to enable several users to work on an audit report simultaneously, the users open the report console in parallel or operate in the test software. This generates situations where an auditor sees data in his report console wherein the data was already changed by another auditor.

The synchronization of these parallel working users is done via the "data field edit list" and the "data field access history." The data field edit list is populated by both the audit software and the report console. The data field access history logs only the accesses of the report console.

The mechanisms only affect fragments that uniquely refer to a data field, i.e., class 1 fragments and class 2 fragments.

Technically, this is handled in "Event 4: Timed trigger"

Detection of Changes

In order to be able to detect changes to objects that were performed by other users and that are visible in the report console, the report console checks in continuous and/or configurable time intervals whether changes were performed in the database where the changes were performed after loading into the report console.

Technically, this is handled in "Event 4: Timed trigger"

GUID

A globally unique identifier or GUID is a special type of identifier used in software applications to provide a unique reference number. The value is represented as a 32-character hexadecimal string and is usually stored as a 128-bit integer. The primary purpose of the GUID is to have a totally unique number.

Hardware

Figure 2:
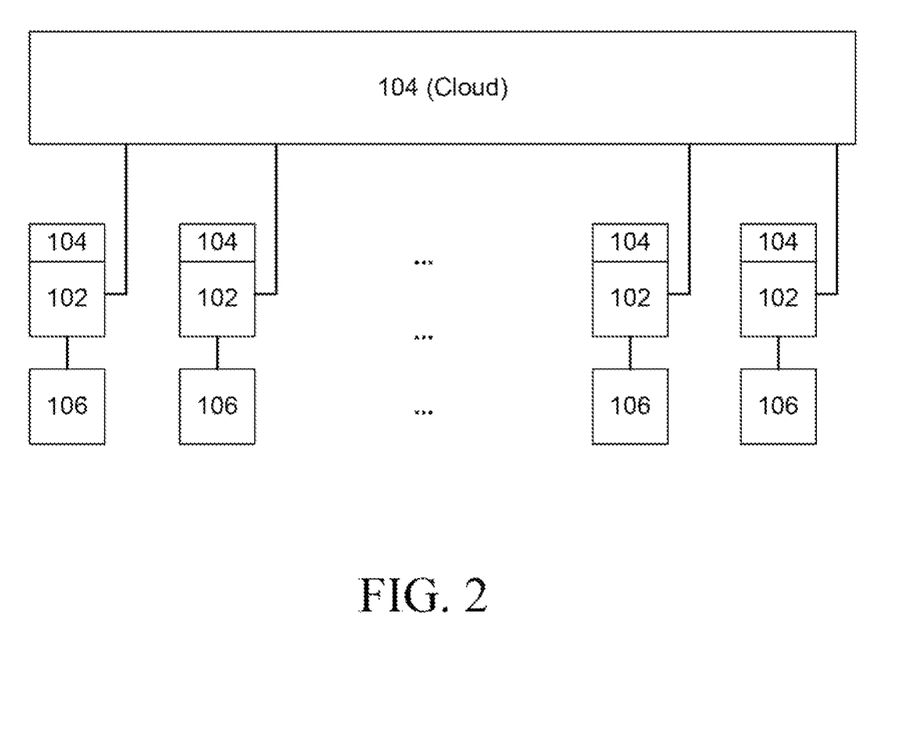
FIG. 2 illustrates an exemplary embodiment where the method according to the invention may be implemented.

The hardware to implement the method according to the invention includes at least one computer, at least one display, and at least one storage medium. FIG. 2 illustrates an exemplary embodiment where the method according to the invention may be implemented. Here multiple computers 102 connected via one or more networks 104 (cloud, internet, ethernet, local area network, or the like). Each computer 102 runs the audit software which is loaded from a storage medium 104 (cloud, compact disk, hard drive, thumb drive, or the like). For each user, his or her respective computer 102 runs the audit software and displays the audit report on his or her respective display 106. The respective user is then able to work with the audit report as discussed above. The audit software can communicate over the network to implement the method according to the invention. Optionally additional devices such as printers, scanners and other devices may also be utilized with the computers 102. The invention provides many advantages over previous methods of preparing audit reports including, but not limited to, reduced effort to prepare the report, reduced errors and/or inconsistencies, streamlined editing, avoids redundant data storage, provides a feeling that the user is working on a report like the final report, saving individual parts takes place in the background making preparation of the report largely transparent/automatic for the user, the formatting rules are guaranteed because the final report is computer generated without human editing, reduced redundant information and associated errors within the audit report (this is in addition to the reduction of inconsistencies between the audit report and database), and more.

Although several embodiments of the present invention and its advantages have been described in detail, it should be understood that changes, substitutions, transformations, modifications, variations, permutations, and alterations may be made therein without departing from the teachings of the present invention, the spirit and the scope of the invention being set forth by the appended claims.

REFERENCE LIST 102 computers
104 one or more networks
106 display
700 data flow chart
702 word processor
704 audit software
706 database
708 draft report
710 final audit report
712 users
800 data flow chart
802 report console
804 audit software
806 database
808 draft report
812 users

What is claimed is:

1. A method for integrated generation of an integrated audit report accessible by plural users, the method comprising the steps of:
providing a computer connected to a communication network; loading audit software into the computer;
providing a display for the computer for viewing by a user;
generating an editable audit report from a report template and a database including objects and properties;
generating an editable draft audit report from the report template and the database including objects and properties;
displaying the editable audit report on the display;
displaying the editable draft audit report on the display; and
the user entering data into the editable audit report and/or the editable draft audit report,
wherein the editable audit report provides a data entry template for entry of the data,
wherein the data entered into the editable audit report is entered into editable fragments,
wherein the data entered into the editable draft audit report is entered into editable fragments,
wherein when a particular user begins editing one of the editable fragments of the editable audit report or the editable draft audit report, only the particular user can edit the one of the editable fragments of the editable audit report or the editable draft audit report until the particular user finishes editing the one of the editable fragments of the editable audit report or the editable draft audit report and any changes made to the one of the editable fragments of the editable audit report or the editable draft audit report by the particular user are processed and stored in the database,
wherein the editable fragments include a first class of fragments, a second class of fragments, and a third class of fragments,
wherein the first class of fragments has multiple data fields that are directly editable but does not include a mask reference,
wherein the second class of fragments has only one data field that is not directly editable and includes a mask reference, and
wherein the third class of fragments has multiple data fields that are not directly editable and includes a mask reference,
wherein the objects and properties of the database are processed by the computer and then the data is transformed by the computer into text in the editable audit report and/or the editable draft report based on a logic of the report template during the generating the editable audit report or the editable draft audit report from the database and the report template, and
wherein the user entering data into the editable audit report and/or the editable draft audit report changes the integrated audit report.

2. The method of claim 1, wherein the integrated audit report is continuously visible during a complication of the integrated audit report.

3. The method of claim 1, wherein the audit software is integrated directly into a word processor program that stores the editable audit report in modifiable components.

4. The method of claim 1, wherein data objects are integrated into an external word processing system or in that the audit software includes an integrated word processing system which can also tie in the data objects.

5. The method of claim 4, wherein the data objects include findings or measures.

6. The method of claim 1, wherein the audit software includes an integrated word processing system able to tie in data objects.

7. The method of claim 1, wherein the storing the data in the database occurs immediately.

8. The method of claim 1, further comprising generating and maintaining a list of data fields which are currently edited by users including a time of last reading.

9. The method of claim 1, wherein the editable audit report is generated from a current content of the database when an audit report console of the audit software is started.

10. The method of claim 9, wherein the editable audit report includes editable and non-editable portions, which of the portions are editable and which of the portions are non-editable is determined from a fragment list compiled after the editable audit report is generated from the current content of the database.

11. The method of claim 10, wherein when a data field in the fragment list is changed, all data fields in the fragment list that are affected by the change are changed in the database.

12. The method of claim 10, wherein for each user of the audit software, the audit software monitors for when a data field in a data field list is changed and changes the editable audit report to reflect the changes in the data field list.

13. The method of claim 12,
wherein the audit software for each user has a time stamp of when each data field in the data field list was last updated, and
wherein each data field in the data field list in the database includes a time stamp indicating when it was last changed.

14. The method of claim 1, wherein plural users can work on the editable audit report simultaneously.

15. The method of claim 14,
wherein the editable audit report includes editable and non-editable portions, and
wherein each of the editable portions is editable by only one of the plural users at a time.

16. The method of claim 15, wherein when a user of the plural uses moves a cursor into an editable portion of the editable portions, a check is made by the audit software whether another user of the plural users is currently editing that editable portion of the editable portions.

17. The method of claim 15, wherein when an editable portion of the editable portions is being edited by one of the plural users, this editable portion of the editable portions becomes blocked from editing until at least one of the following occurs:

the one of the plural users exits the editable portion of the editable portions that was blocked from editing, or the one of the plural users exits the audit software, or the one of the plural users is inactive for a predetermined period of time, or the one of the plural users actively overrides the blocking.

18. The method of claim 15, wherein when an editable data field of the editable portions is being edited by one of the plural users, this editable data field of the editable portions becomes blocked from editing by being listed as the current user until the one of the plural users is deleted for the current user for the editable data field of the editable portions.

19. The method of claim 1, wherein when the editable audit report is generated, the editable audit report is given a globally unique identifier, and the following information is generated:

the report template used to create the editable audit report, an identification of an audit for which the editable audit report is generated, a user who created the editable audit report, a time of generation of the editable audit report, a fragment list of each editable fragment used in the editable audit report, and a data field access history of the editable audit report.

20. The method of claim 1, wherein data is loaded from the database and inserted into the editable audit report as fragments when generating the editable audit report.

21. The method of claim 1, wherein each editable fragment determines its associated report global unique identifier, fragment global unique identifier, and class during editable audit report generation.

22. The method of claim 1, wherein for each data field that is part of the first class of fragments or the second class of fragments, a data field access history records when each data field was read and written.

23. The method of claim 1, wherein each editable fragment can only be edited by one user at a time.

24. The method of claim 1, wherein each editable fragment of the first class of fragments has an associated marker having a global unique identifier where the associated marker has a starting portion at the beginning of each editable fragment of the first class of fragments and an ending portion at the end of each editable fragment of the first class of fragments.

* * * * *